Feb. 6, 1951 J. H. MOSIER 2,540,279
BOAT TRAILER
Filed June 20, 1947
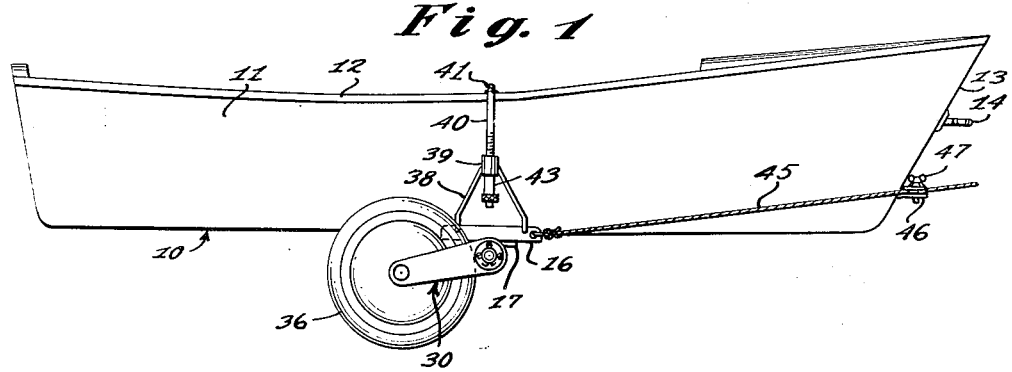
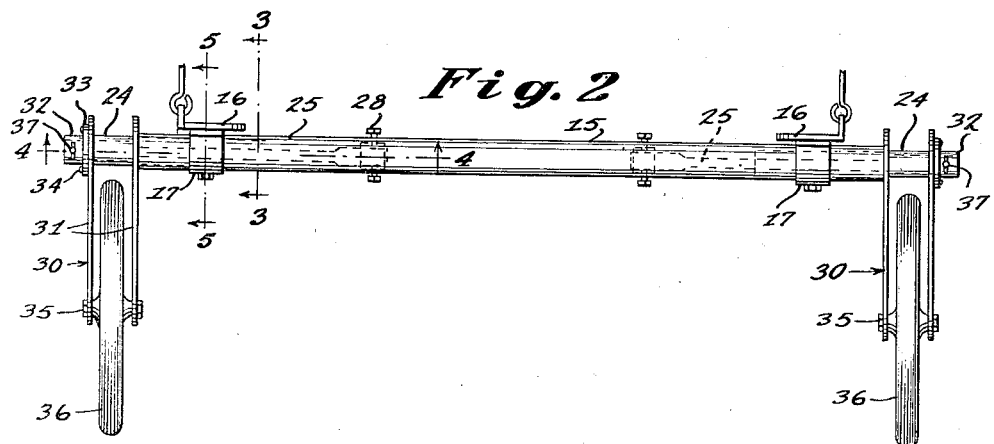
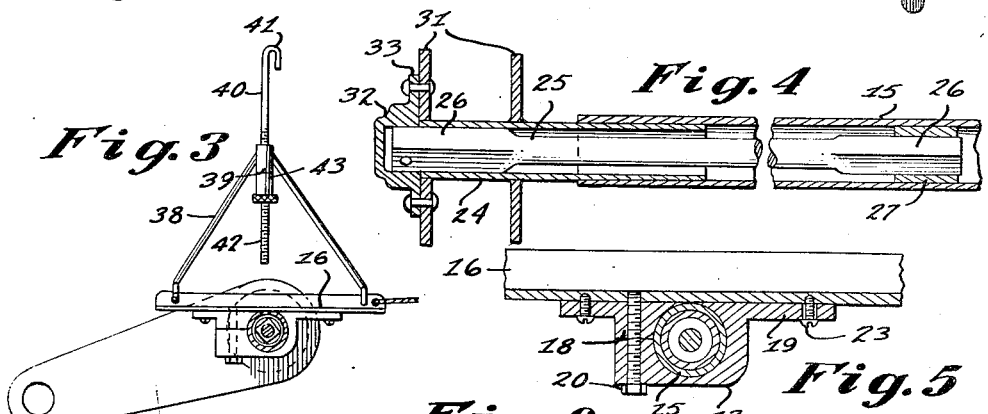
Inventor
JOSEPH H. MOSIER
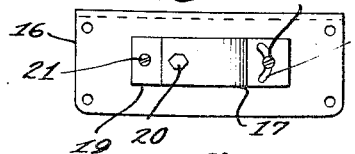
By McMorrow, Berman & Davidson
Attorneys Patented Feb. 6, 1951

2,540,279

UNITED STATES PATENT OFFICE 2,540,279

BOAT TRAILER

Joseph H. Mosier, Flint, Mich.

Application June 20, 1947, Serial No. 755,817

2 Claims. (Cl. 280—33.4)

This invention relates to improvements in wheeled supports and more particularly to wheeled support means for supporting a small boat so that the boat may be towed over the road behind an automobile or may be moved about on the ground and, although the device has other uses such as supporting a bed, box or platform in or upon which a load may be carried, transporting timbers and other elongated objects, since its primary utility is to support a boat for towing behind an automobile, the assembly will hereinafter be referred to as a boat trailer.

It is among the objects of the invention to provide an improved boat trailer upon which the boat is resiliently sprung during transportation, which can be easily disassembled and stored in a small space or transported in an automobile trunk compartment, which is widely adjustable to fit boats of different sizes and shapes, which is quickly and easily attachable to a boat to hold the boat firmly in place thereon, which has its wheels firmly supported relative to each other against wobble and non-parallel operation, and which is simple in construction, economical to manufacture and extremely durable in use.

Other objects and advantages will become apparent from a consideration of the following description in conjunction with the accompanying drawing, wherein:

Figure 1 is a side elevation of a boat showing in end elevation the application thereto of a boat trailer illustrative of the invention.

Figure 2 is a front elevation of the boat trailer illustrated in Figure 1.

Figure 3 is a transverse cross-section on the line 3—3 of Figure 2.

Figure 4 is a transverse cross-section on a somewhat enlarged scale on the line 4—4 of Figure 2.

Figure 5 is a transverse cross-section on a somewhat enlarged scale on the line 5—5 of Figure 2.

Figure 6 is a bottom plan view of a boat supporting angle bracket and split block adjustably secured thereto.

With continued reference to the drawing, the boat, generally indicated at 10, is of conventional construction having sides 11, gunwales 12 and a bow 13 from which extends a towing eye 14 permanently secured to the bow of the boat and adapted to cooperate with a rubber insulated towing pin secured to the rear end of a towing vehicle.

The boat is supported intermediate its length upon a transversely extending tubular quill shaft 15 by means of angle brackets 16 each of which comprises a flat bottom plate and a flange along the outer edge of the bottom plate. The angle brackets are adjustably secured to the quill shaft 15 by means of split, apertured blocks 17 particularly illustrated in Figure 5. Each of these blocks comprises a portion having therethrough an aperture which receives the quill shaft 15, a saw cut 18 extending transversely therethrough at one side of the aperture and an integral top plate portion 19. The apertured portion of the block is clamped about the quill shaft by a suitable through bolt 20 which may be loosened so that the block may be moved lengthwise of the quill shaft to properly space the brackets 16 for boats of different sizes and shapes.

The plate portion 19 is provided in one end thereof with a hole through which a bolt 21 extends, which bolt is threaded into the bottom plate of the corresponding angle bracket 16, and in the opposite end with an elongated, arcuate slot 22 through which a bolt 23 extends into the bottom plate of the angle bracket so that the angle bracket can be angularly adjusted relative to the supporting block to bring the side flanges of the angle bracket into proper alignment with the sides of boats of different shapes and widths. A pair of tubular sleeves 24 are rotatably received, one in each end portion of the quill shaft 15, and a pair of torque spring shafts 25 are operatively connected between the sleeves 24 and the quill shaft 15. Each torque shaft 25 has squared or non-circular end portions 26 and a reduced cylindrical intermediate portion between the end portions.

The outer end portion of each torque shaft is rigidly secured to the outer ends of the corresponding sleeve 24 and the inner end is received in a bushing 27 which is rigidly secured in the quill shaft 15 by suitable means such as the sest screws 28 and provided with a squared or non-circular aperture which closely fits the inner squared or non-circular end of the torque shaft 25.

The outer ends of the sleeves 24 extend outwardly of the corresponding ends of the quill shaft and wheel carrying arms, generally indicated at 30, are operatively connected respectively to the outer end portions of the sleeves. Each wheel carrying arm comprises a pair of side members 31 which may be formed from flat plate stock, each side member being apertured at one end to receive the projecting end portion of the sleeve 24 therethrough. A fitting 32 having therethrough a squared or non-circular aperture fitting the outer squared or non-circular end portion of the corresponding torque shaft is fitted upon the outer end of the torque shaft at each end of the quill shaft 15 and provided with an annular flange 33 through which fastening elements 34, such as suitable bolts or rivets, pass into the end portion of the outer side member 31 of the arm 30 secured at the corresponding end of the quill shaft.

By this means both arms 30 are supported at corresponding ends upon respective sleeves 24 for rotation relative to the quill shaft 15 and are secured to the outer ends of the respective torque shafts 25 against relative rotation so that rotation of the arms relative to the quill shaft is resiliently resisted by the torque shafts.

When the device is in operative position, the arms 30 extend rearwardly, substantially horizontally from the ends of the quill shaft to the corresponding wheel axle and the torsional forces so applied to the torque shaft are resiliently resisted so that the boat is resiliently sprung upon the boat carrying wheels by the torsional spring assembly.

Wheel axles 35 extend through the outer ends of the sides 31 of the arms 30, that is the ends remote from the sleeve 24, and road wheels 36 are journaled on these axles.

Preferably the two side members 31 of the arms are welded in spaced apart parallel relationship to the corresponding sleeve 24 and the end fitting 32 is permanently connected to the outer side member so that the two side members, the sleeve and its fitting together constitute a unit which is slidable over the outwardly projecting ends of the torque shaft and into the corresponding end of the quill shaft. The fitting may be held in operative position relative to the torque shaft and the quill shaft by a suitable axle pin 37 extending through the fitting 32 and the outer end portion of the torque shaft.

A triangular strut 38 is pivotally connected at its wide end to the side flange of each angle bracket 16 and has connected to its upper pointed end an apertured sleeve or bushing 39 through which extends a shaft 40 having a hook 41 at its upper end and external screw threads 42 on its lower end portion. An internally screw-threaded nut or bushing 43 is screwed onto the shaft 40 below the bushing 39. When the boat is in operative position on the brackets 15, as illustrated in Figure 1, the hooks 41 of the rods 40 are placed over the corresponding gunwales of the boat and the nuts 43 tightened to keep the boat firmly on the brackets 16 so that it will be rigidly supported on the trailer.

A pull cable 45 has its end secured to the front ends of the angle brackets 16 and passes around the bow of the boat, the end portions being secured together at the bow of the boat by a clamp fitting 46 which comprises a pair of angularly grooved plates forced together upon the side portions of the cable by a thumb-screw 47 passing through a central aperture in the top plate and threaded into the bottom plate.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A boat trailer, comprising a transverse axle to be mounted beneath the boat, wheels secured to the ends of the axle, elongated substantially horizontal plates arranged above the axle and provided at their outer longitudinal edges with upstanding flanges, each upstanding flange being provided near its rear end with an opening and near its forward end with a plurality of openings, a lower plate arranged beneath each elongated plate and provided at its rear end with an opening and near its forward end with a transverse curved slot, a pivot element secured to the elongated plate and extending through the opening at the rear end of the lower plate, a clamping element secured to the elongated plate and extending through the transverse curved slot of the lower plate, a depending block formed upon each lower plate and having an opening to receive the axle and having one end thereof slit, a bolt having screw-threaded engagement with the slit end of the block to clamp the block to the axle in the selected adjusted position, a sleeve arranged above each elongated plate, a pair of downwardly diverging rods secured to the sleeve and having their lower ends extending into the openings near the front and rear ends of the upstanding flange of each elongated plate, an upstanding rod longitudinally adjustably mounted in each sleeve and provided at its top with a hook to engage over the top of the side of the boat, an adjusting nut having screw-threaded engagement with each upstanding rod and arranged beneath the sleeve, and a draft device including elements arranged upon opposite sides of the boat and having their rear ends held within the openings near the forward ends of the flanges.

2. In a boat trailer, a tubular quill shaft to be arranged beneath the boat, means to mount the boat upon the quill shaft, a sleeve slideably mounted in each end of the tubular quill shaft, a collar mounted within the tubular quill shaft inwardly of the sleeve and having an opening which is polygonal in cross-section, a wheel arranged near each sleeve, a device rigidly secured to the sleeve and extending radially thereof and carrying the wheel, a torsional spring shaft provided at its inner end with a head which is polygonal and held within the polygonal opening of the collar, means to adjustably clamp the collar within the tubular quill shaft, a second head formed upon the outer end of the torsional spring shaft and formed polygonal in cross section, a fitting having a socket which is polygonal in cross section to receive the outer head, means to secure the fitting to the adjacent device, and a pin passing through the fitting and the outer polygonal head.

JOSEPH H. MOSIER.

REFERENCES CITED

The following references are of record in the file of this patent:

UNITED STATES PATENTS

| Number | Name | Date |
|---|---|---|
| 1,208,182 | Martin | Dec. 12, 1916 |
| 1,632,922 | Sagar | June 21, 1927 |
| 2,059,908 | Rabe | Nov. 3, 1936 |
| 2,060,015 | Barnes et al. | Nov. 10, 1936 |
| 2,124,006 | Parker | July 19, 1938 |
| 2,297,465 | Froehlich | Sept. 29, 1942 |
| 2,361,951 | Livermon | Nov. 7, 1944 |